(12) United States Patent
MacDonald et al.

(10) Patent No.: US 8,432,309 B2
(45) Date of Patent: Apr. 30, 2013

(54) AUTOMOTIVE RADAR SYSTEM AND METHOD FOR USING SAME

(75) Inventors: James D. MacDonald, Chandler, AZ (US); Lawrence A. Rubin, Sykesville, MD (US)

(73) Assignee: Freescale Semiconductor, Inc., Austin, TX (US)

( * ) Notice: Subject to any disclaimer, the term of this patent is extended or adjusted under 35 U.S.C. 154(b) by 235 days.

(21) Appl. No.: 12/955,625

(22) Filed: Nov. 29, 2010

(65) Prior Publication Data

US 2012/0133547 A1 May 31, 2012

(51) Int. Cl.
*G01S 13/08* (2006.01)

(52) U.S. Cl.
USPC ............ 342/137; 342/123; 342/136; 342/147

(58) Field of Classification Search ................... 342/128, 342/137, 136
See application file for complete search history.

(56) References Cited

U.S. PATENT DOCUMENTS

| | | | |
|---|---|---|---|
| 5,517,196 A | | 5/1996 | Pakett et al. |
| 5,530,447 A | * | 6/1996 | Henderson et al. ............. 342/70 |
| 5,714,927 A | | 2/1998 | Henderson et al. |
| 6,243,024 B1 | | 6/2001 | Yamabuchi |
| 6,784,828 B2 | | 8/2004 | Delcheccolo et al. |
| 6,995,730 B2 | | 2/2006 | Pleva et al. |
| 7,071,868 B2 | | 7/2006 | Woodlington et al. |
| 7,202,776 B2 | | 4/2007 | Breed |
| 7,248,215 B2 | | 7/2007 | Pleva et al. |
| 7,324,039 B2 | | 1/2008 | Boltovets et al. |
| 7,411,542 B2 | | 8/2008 | O'Boyle |
| 7,504,932 B2 | | 3/2009 | Bartels |
| 2003/0076255 A1 | * | 4/2003 | Ono ................................ 342/70 |
| 2004/0056793 A1 | * | 3/2004 | Matsubara et al. ............. 342/70 |
| 2007/0164896 A1 | | 7/2007 | Suzuki et al. |
| 2007/0241962 A1 | * | 10/2007 | Shinoda et al. ............... 342/361 |

FOREIGN PATENT DOCUMENTS

EP 1923717 A1 5/2008

OTHER PUBLICATIONS

Norton et al., The Maximum Range of a Radar Set, Proceedings of the I.R.E. and Waves and Electrons 35 (No. 1), Jan. 1947, pp. 4-24.

(Continued)

*Primary Examiner* — Timothy A Brainard
(74) *Attorney, Agent, or Firm* — Schmeiser, Olsen & Watts LLP; Lowell W. Gresham; Charlene R. Jacobsen

(57) ABSTRACT

A radar system (44) for a vehicle (42) includes a transmit unit (56) and a receive unit (58). The transmit unit (56) includes a single beam antenna (72) for output of a radar signal (74) into a target zone (46). The receive unit (58) includes a single beam antenna (76) for receiving a direct receive signal (78) and an indirect receive signal (80). The receive signals (78, 80) are reflections of the radar signal (74) from an object (34, 36) in the target zone (46). The indirect receive signal (80) is reflected off the object (34, 36) toward a reflective panel (54) of the vehicle (42), and the indirect receive signal (80) is reflected off the reflective panel (54) for receipt at the receive antenna (76). The receive signals (78, 80) are summed to produce a detection signal (81) indicating presence of the object (34, 36) in the target zone (46).

17 Claims, 4 Drawing Sheets

OTHER PUBLICATIONS

Blake, L. V., A Guide to Basic Pulse-Radar Maximum-Range Calculation, Part 2—Derivations of Equations, Bases of Graphs, and Additional Explanations, NRL Report 7010, Radar Geophysics Branch, Radar Division, Department of the Navy, Naval Research Laboratory, Washington, D.C., Dec. 31, 1969, 25 pages.

Blake, L. V., A Guide to Basic Pulse-Radar Maximum-Range Calculation, Part 1—Equations, Definitions, and Aids to Calculation, NRL Report 6930, Radar Geophysics Branch, Radar Division, Department of the Navy, Naval Research Laboratory, Washington, D.C., Dec. 31, 1969, 25 pages.

Nelson, Radio Transmission System for Television, Transactions of the American Institute of Electrical Engineers, Jan. 1927, pp. 954-962.

Crosby, Frequency Modulation Propagation Characteristics, Proceedings of the Institute of Radio Engineers, vol. 24, No. 6, Jun. 1936, pp. 898-913.

Kogon, Mainbeam Jammer Suppression Using Multipath Returns, Signals, Systems and Computers Conference, 1997, pp. 279-283.

Berube, Target Height Estimation using Multipath Over Land, IEEE Radar Converence, 2007, pp. 88-92.

Sen, Adaptive OFDM Radar for Detecting a Moving Target in Urban Scenarios, International Waveform Diversity and Design Conference, 2009, pp. 268-272.

Krolik, Exploiting Multipath Propagation for GMTI in Urban Environments, IEEE Conference on Radar, 2006, pp. 65-68.

Graves, Detection of Airborne Targets by a Space-Based Radar Using Multipath Interference, IEEE National Radar Conference, 1991, pp. 46-49.

Blake, L.V., Recent Advancements in Basic Radar Range Calculation Technique, IRE Transactions on Military Electronics, Apr. 1961, pp. 154-164.

Venkatasubramanian, A Robust Chaos Radar for Collision Detection and Vehicular Ranging in Intelligent Transportation Systems, IEEE 2004, pp. 548-552.

* cited by examiner

PRIOR ART

AUTOMOTIVE RADAR SYSTEM AND METHOD FOR USING SAME

TECHNICAL FIELD OF THE INVENTION

The present invention relates generally to radar systems for use in vehicles. More specifically, the present invention relates to a radar system for detecting objects in a target zone using multipath signal components of a single beam antenna.

BACKGROUND OF THE INVENTION

There is an increasing trend to include radar systems in commercially available automotive products such as automobiles, trucks, buses, and the like in order to provide a driver with enhanced awareness of objects around his or her vehicle. As the vehicle approaches objects (e.g. other cars, pedestrians, and obstacles) or as objects approach the vehicle, a driver cannot always detect the object and perform intervention actions needed to avoid a collision with the object. For example, a driver of a vehicle may not be able to detect an object in the so-called "blind spot" of the vehicle. This blind spot region varies depending on the type of vehicle, the size and seated position of the driver, the type and setting of the outside minors, and so forth. An automotive radar system mounted on a vehicle can detect the presence of objects including other vehicles in proximity to the vehicle and provide the driver with timely information so that the driver can perform possible intervention actions. In order to effectively detect the presence of objects in the regions of limited visibility, such as in the blind spot, automotive radar systems typically include multiple beam antennas to provide wide coverage area.

FIG. 1 shows a diagram of a vehicle 20 with a prior art automotive radar system 22 disposed on a side thereof. Automotive radar system 22 may be provided as a side object detection system (SOD), sometimes referred to as a blind spot detection system. A typical prior art automotive radar system, such as radar system 22, includes a planar array antenna capable of generating multiple antenna beam patterns or radiation patterns. In this illustration, four antenna beam patterns (or more simply "beams") 24A, 24B, 24C, and 24D are shown. For automotive radar applications, beam patterns 24A, 24B, 24C, and 24D are arranged such that their vertical patterns (or elevation) are narrow and parallel to the surface of road 26, and their horizontal (or azimuth) patterns generally cover the nominally quarter plane parallel to the surface of road 26 and are limited by the edge of vehicle 20 and the location of radar system 22 on vehicle 20.

Radar system 22 is capable of detecting with high probability objects, such as other vehicles, moving along a path 28 which is parallel to the path of vehicle 20 in which radar system 22 is disposed. The objects may be, for example, other vehicles approaching and passing vehicle 20. In this exemplary scenario, two objects are present in a lane 30 adjacent to a lane 32 in which vehicle 20 is traveling. One object 34, labeled "A," may be adjacent vehicle 20, and another object 36, labeled "B," may be approaching and overtaking vehicle 20. In order to effectively detect objects 34 and 36, multiple antenna beam patterns (e.g., beams 24A, 24B, 24C, and 24D) from a radar antenna are called for to provide sufficient angular coverage and antenna gain. For example, in response to a radar signal transmitted from radar system 22, a receive signal 38 reflected from object 34 and detectable within beam pattern 24D can identify the probable presence of object 34 in lane 30. Similarly, in response to a radar signal transmitted from radar system 22, a receive signal 40 reflected from object 36 and detectable within beam pattern 24A can identify the probable presence of object 36 in lane 30.

Additional multipath signal components referred to as indirect receive signals 41 may also be received at radar system 22. Indirect receive signals 41 may be reflections of the radar signal from an object (e.g., object 34 and/or object 36) onto a reflective panel of, for example, vehicle 20. These reflections are subsequently reflected off the reflective panel and are received at a receiving antenna of radar system 22. Indirect receive signals are considered interference, or nuisance signals, and are typically filtered or otherwise attenuated by most radar configurations, such as the multiple beam antenna configuration of radar system 22.

Relatively strict requirements are imposed on the physical size, the operational performance, and the cost of automotive radar systems. Unfortunately, multiple beam antenna systems are complex and thus result in relatively high cost systems.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

According to embodiments of the present disclosure, an automotive radar system and methodology are disclosed that apply a combination of multipath and directly propagated signal components, e.g., direct and indirect reflected radar signals, to detect objects in a side object detection system. Such a combination of direct and indirect reflected radar signals in a side object detection system allow the use of a simple single beam antenna to provide the sensitivity and angular coverage that would otherwise require a more complex and thus more costly multiple beam switched or scanning antenna system.

Figure 1:
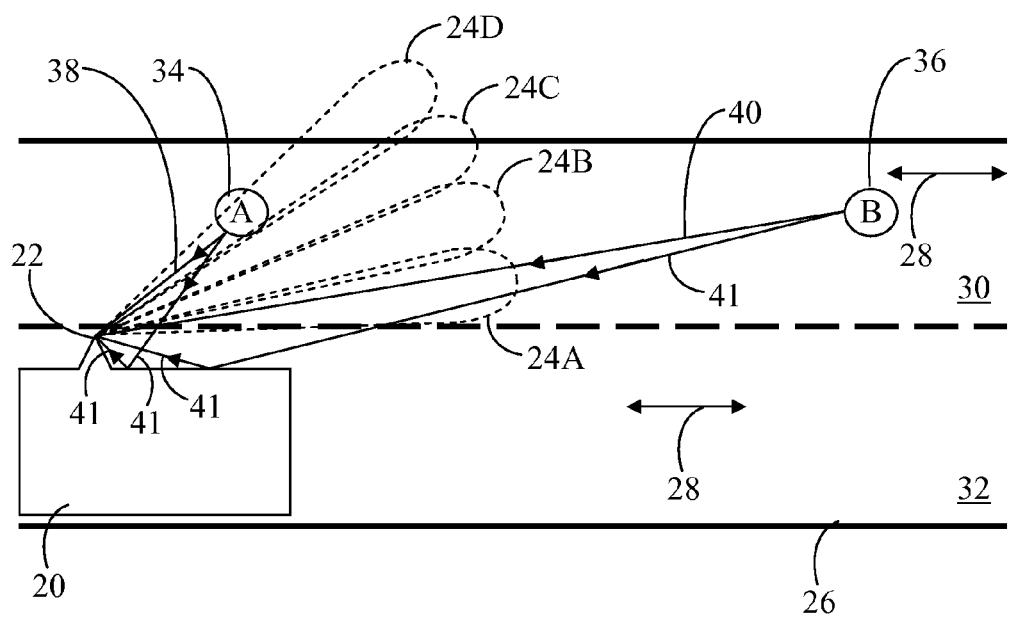
FIG. 1 shows a diagram of a vehicle with a prior art automotive radar system disposed on a side thereof.
Figure 2:
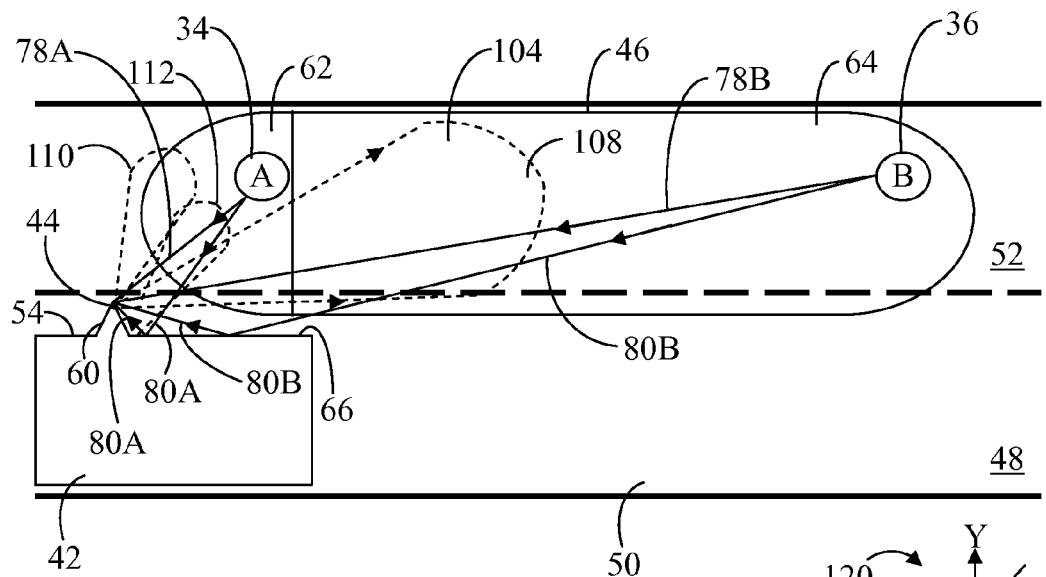
FIG. 2 shows a diagram of a vehicle with an automotive radar system disposed on a side thereof in accordance with an embodiment.
Figure 3:
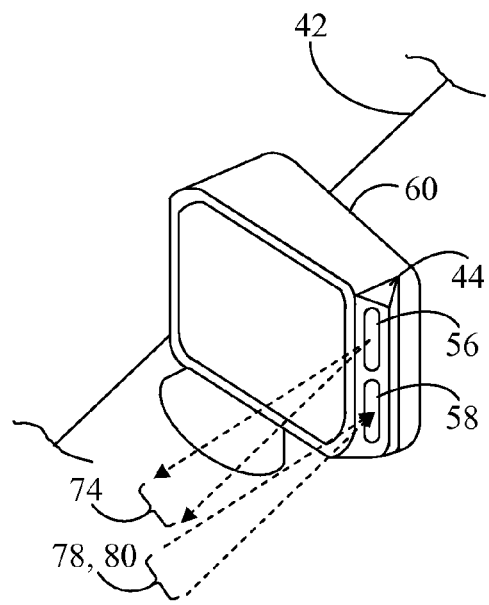
FIG. 3 shows a partial perspective view of the automotive radar system.

Referring to FIGS. 2-3, FIG. 2 shows a diagram of a vehicle 42 with an automotive radar system 44 disposed on a side thereof in accordance with an embodiment, and FIG. 3 shows a partial perspective view of automotive radar system 44 mounted on vehicle 42. Automotive radar system 44 may be utilized, for example, as a side object detection system for detecting objects in a target zone 46 external to vehicle 42.

Accordingly, as vehicle 42 travels in a lane 48 of a road 50, this target zone 46 may be an area in a lane 52 adjacent to lane 48.

In this illustration, automotive radar system 44 is located at an extreme outside location on a side 54 of vehicle 42. For example, side 54 may be the passenger side of vehicle 42. A transmit unit 56 and a receive unit 58 of automotive radar system 44 may be mounted or otherwise affixed to an outside minor 60 on side 54 of vehicle 42. Alternatively, or in addition, transmit and receive units 56 and 58, respectively, may be located on the driver side of vehicle 42. Although automotive radar system 44 is illustrated as being affixed to outside mirror 60, it should be understood that transmit and receive units 56 and 58, respectively, may be located at any suitable location adjacent to a metallic surface (passenger side and/or driver side) on vehicle 42. Suitable locations may include, for example, fenders, bumpers, door panels, windows, roof areas, and so forth.

Target zone 46 may be defined to include a first region 62 immediately adjacent to side 54 of vehicle 42 and a second region 64 displaced outwardly and backwardly from a rear quarter panel 66 of vehicle 42. First region 62 of target zone 46 corresponds to a vehicle's blind spot, i.e., an area around vehicle 42 that cannot be directly observed under existing circumstances. As will be discussed below, automotive radar system 44 is capable of detecting the presence of objects within target zone 46, such as object 34, labeled "A," in first region 62 (i.e., the blind spot) adjacent to vehicle 42 as well as object 36, labeled "B," in second region 64 which is behind but approaching and overtaking vehicle 42. Although target zone 46 is described herein as having two regions 62 and 64, it should be understood that a particular target zone 46 need not have two distinct and separate non-overlapping regions. Rather, the depiction of first and second regions 62 and 64, respectively, is intended to point out that automotive radar system 44 can be configured to detect the presence of objects both beside vehicle 42 and behind, but displaced outwardly from, vehicle 42.

Figure 4:
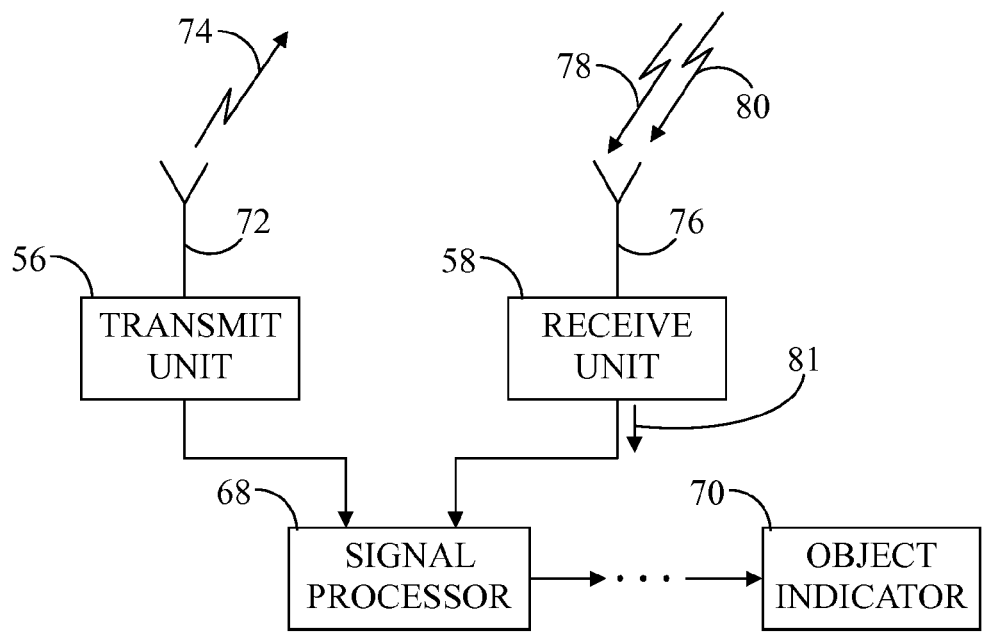
FIG. 4 shows a block diagram of the automotive radar system.

Referring to FIG. 4 in connection with FIGS. 2 and 3, FIG. 4 shows a block diagram of automotive radar system 44. Automotive radar system 44 generally includes transmit unit 56 and receive unit 58 in communication with a signal processor 68. Signal processor 68 may additionally be in communication with an object indicator 70, both of which will be discussed below. Automotive radar system 44 may additionally include analog-to-digital converters, amplifiers, voltage controlled oscillators, tuning control features, signal analysis features, and so forth in accordance with known and developing radar systems.

In an exemplary configuration, automotive radar system 44 may be a frequency modulated continuous wave radar that uses a frequency spectrum of, for example, 76-81 GHz. An exemplary technology is a 77 GHz radar technology for collision warning and avoidance. The 77 GHz radar technology can provide long- and mid-range functionality, thus allowing automotive systems to monitor the environment around the vehicle to help prevent collisions. Long-range typically has long and narrow coverage directly in front and back of the car and is used for adaptive cruise control and lane departure warnings. Whereas, short-range radar functionality monitors the car's immediate surroundings with a relatively wide spatial view that covers shorter distances, and is thus useful for blind spot detection, pre-crash and stop-and-go applications. Although a 77 GHz radar technology is mentioned herein, other suitable radar systems may be implemented in alternative embodiments.

In accordance with an embodiment, transmit unit 56 includes a single beam transmit antenna 72 for output of a radar signal 74 into target zone 46. Likewise, receive unit 58 includes a single beam receive antenna 76 capable of receiving a direct receive signal 78 and an indirect receive signal 80. Each of direct and indirect receive signals 78 and 80 are reflections of radar signal 74 from an object, e.g., either of objects 34 and 36, in target zone 46. In an embodiment, direct and indirect receive signals 78 and 80 are weighted by the directivity of the antenna pattern in their separate directions of arrival and summed at receive antenna 76. The combined signal is then received and processed to provide a detection signal 81 indicating presence of an object, e.g., objects 34 and 36, in target zone 46.

Detection signal 81 may be communicated to processor 68 for suitable signal analysis to determine relative location of the object within target zone 46 and/or to determine necessity of notifying a driver of vehicle 42 of the presence of an object, e.g., objects 34 and 36, in target zone 46. Object indicator 70 may be a vehicle control computer that provides an indicator function. Object indicator 70 may produce an audible tone, a visual signal, a vibratory signal, or any other appropriate signal within vehicle 42 to provide notification to the operator of vehicle 42.

Figure 5:
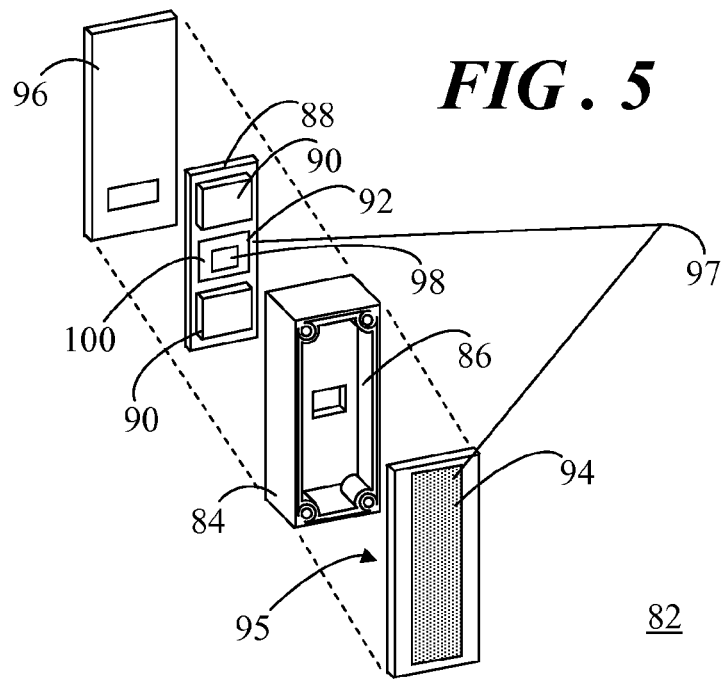
FIG. 5 shows an exploded view of a module that may be embodied as either a transmit unit or a receive unit of the automotive radar system.

FIG. 5 shows an exploded view of a module 82 that may be embodied as either transmit unit 56 or receive unit 58 of automotive radar system 44. Similar structure and components are used to produce transmit unit 56 as well as receive unit 58. As such, the ensuing generalized discussion of module 82 applies equivalently to transmit and receive units 56 and 58, respectively.

Module 82 includes a housing 84 in which the components of module 82 are located. In an embodiment, automotive radar system 44 includes transmit unit 56 (FIG. 4) and receive unit 58 (FIG. 4) that are separate and isolated from one another. Thus, materials forming housing 84 are selected so that radar signal 74 (FIG. 4) output from transmit unit 56 (FIG. 4) does not interfere with, or degrade, direct and indirect receive signals 78 and 80 (FIG. 4) received at receive unit 58 (FIG. 4). In an alternative embodiment shown in FIG. 3, both transmit and receive units 56 and 58 may be housed in a single housing in which transmit and receive units 56 and 58 are isolated from one another in a two cavity housing design.

Housing 84 may be lined with a molded absorber material 86 per conventional practice. Absorber 86 functions to absorb radio waves that may be bouncing around, i.e., reflecting, inside of housing 84. In addition, a module specific printed circuit board 88 having a chip package 90, a feed antenna 92, and an external connector (not visible) is contained in housing 84. A dielectric lens 94 attaches to housing 84 such that feed antenna 92 is mounted proximate a back surface 95 of dielectric lens 94, and a back cover 96 attaches to the back of housing 84. The combination of feed antenna and dielectric lens 94 form a single beam antenna 97. Chip package 90 may be a transmit chip package for transmit unit 56, or alternatively, a receive chip package for receive unit 58. Similarly, single beam antenna 97 may be single beam transmit antenna 72 for transmit unit 56, or alternatively, single beam receive antenna 78 for receive unit 58.

In an embodiment, feed antenna 92 for single beam antenna 97 (as either single beam transmit antenna 72 or single beam receive antenna 78) may be a patch antenna having a single patch element 98 that is stabilized to produce a free space equivalent antenna pattern. A patch antenna is an antenna in which patch element 98 is mounted on, for example, a silicon or ceramic substrate 100. In an embodiment, patch element 98 may be stabilized to produce a free space equivalent antenna pattern using a metamaterial. A metamaterial is a material that obtains its electromagnetic properties from its structure rather than from its chemical composition. By way of example, a metamaterial can be a material engineered to have features of a size less than that of the wavelength of a class of electromagnetic radiation. The electromagnetic waves, e.g., radar signal 74 (FIG. 4) are reflected from the edges of the substrate and cause the radiation pattern of patch element 98 to be distorted. These electromagnetic waves propagate or travel on the surface of the substrate. Through the use of metamaterials on the surface of substrate 100 around patch element 98, reflections of the electromagnetic waves are reduced. Because the reflections are reduced, the radiation pattern of patch element 98 is close to a theoretical patch in free space. The resulting feed antenna 92, stabilized using a metamaterial to produce a free space equivalent antenna pattern, thus provides a good feed for dielectric lens 94. That is, the metamaterial stabilized patch antenna 92 acts as a source of radio waves that are then focused by dielectric lens 94.

The implementation of metamaterials to stabilize patch element 98 results in relatively simple fabrication practices and small size for a desired level of performance. However, alternative and/or additional techniques may be implemented with patch element 98 to suppress the surface electromagnetic waves. These alternative and/or additional techniques include, for example, absorbers and slot structures. Additionally, although a metamaterial stabilized patch antenna 92 is discussed above, a desired antenna radiation pattern can be produced by a variety of quasi-optical antennas (i.e., antennas based on optical design methods typically at millimeter wave frequencies) with mildly tapered feeds (i.e., producing the desired side lobe levels).

Figure 6:
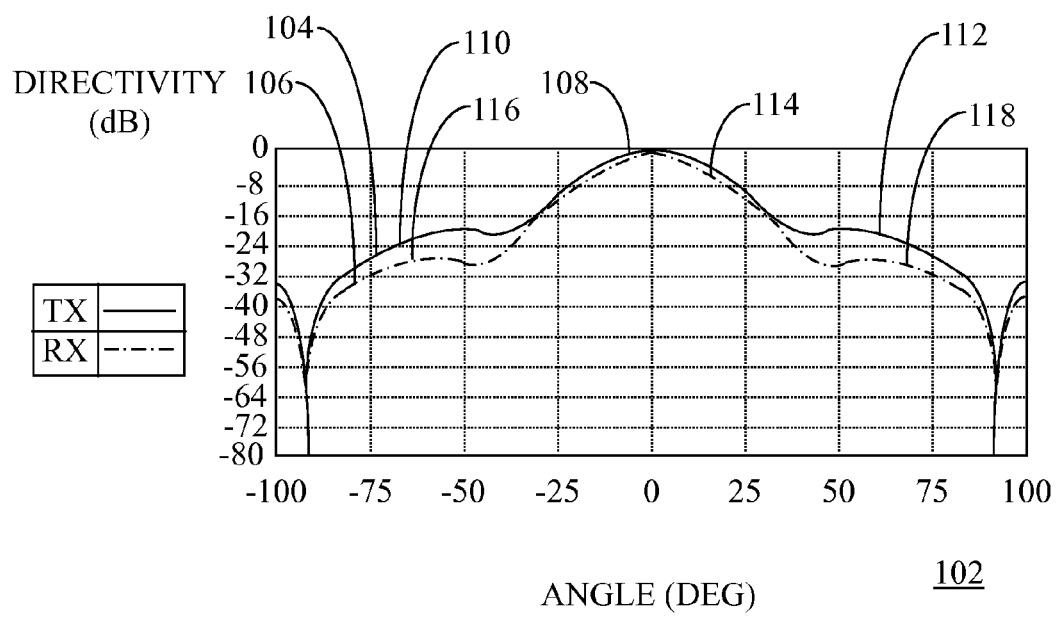
FIG. 6 shows a graph of transmit and receive antenna patterns produced by respective transmit and receive units of the automotive radar system.

FIG. 6 shows a graph 102 of a transmit antenna pattern 104 and a receive antenna pattern 106 produced by respective transmit and receive units 56 and 58 of automotive radar system 44. Transmit antenna pattern 104 is represented in graph 102 by a solid curve, and receive antenna pattern 106 is represented in graph 102 by a dash-dot curve.

The term "antenna pattern" typically refers to the directional dependence of radiation from an antenna. Thus, an antenna pattern, also known as an antenna radiation pattern, beam pattern, beam, radiation pattern, and so forth, represents the radiating properties of its corresponding antenna. Transmit and receive antenna patterns 104 and 106 can represent the radiant intensity, the electric field strength, or the radiation power density emitted from of the corresponding single beam transmit antenna 72 and receive antenna 76 (FIG. 4) as a function of the direction from the antenna.

The direction of maximum radiation intensity, or power, defines a main lobe of an antenna pattern. Other local maxima, weaker than the main lobe, define the secondary lobes or side lobes of the antenna pattern. As such, an antenna pattern can include side lobes in which the radiation density is less than the radiation density of the main lobe. Transmit antenna 72 (FIG. 4) produces transmit antenna pattern 104 directed into target zone 46 (FIG. 2). Likewise, receive antenna 76 produces receive antenna pattern 106 directed into target zone 46.

In an embodiment, transmit antenna pattern 104 includes a main lobe 108 and first side lobes 110 and 112 joined, or immediately adjacent, to each side of main lobe 108. The relationship between main lobe 108 and first side lobes 110 and 112 of antenna pattern 104 can be visualized in graph 102. Similarly, receive antenna pattern 106 includes a main lobe 114 and first side lobes 116 and 118 joined, or immediately adjacent, to each side of main lobe 114. Again, the relationship between main lobe 114 and first side lobes 116 and 118 of antenna pattern 106 can be visualized in graph 102. The term "first side lobes" used herein refers to those side lobes of an antenna pattern that are immediately adjacent to a main lobe of an antenna pattern. Those skilled in the art will recognized that an antenna pattern can include additional side, or secondary, lobes on each side of the main beam, not shown for clarity of illustration.

In accordance with an embodiment, each of transmit and antenna patterns 104 and 106 has shoulder-type first side lobes. That is, the shoulder-type first side lobes 110 and 112 of transmit antenna pattern 104 are relatively broad and do not have sharply defined nulls around main lobe 108. Likewise, the shoulder-type first side lobes 116 and 118 of transmit antenna pattern 106 are relatively broad and do not have sharply defined nulls around main lobe 114. Power levels for side lobes 110, 112, 116, and 118 may be between 15 dB and 30 dB below the power level of corresponding main lobes 108 and 114. This type of antenna pattern can be produced by a variety of quasi-optical antennas with mildly tapered feeds, as discussed above.

Side lobes are radiation in undesired directions which typically make a receive antenna more vulnerable to noise from incoming nuisance signals, and which typically make outgoing signals from a transmit antenna more vulnerable to detection. However, in accordance with an embodiment, the presence of first side lobes 110 and 112 adjacent to main lobe 108 of transmit antenna pattern 104 are exploited for the purpose of transmitting radar signal 72 (FIG. 4) throughout target zone 46 which encompasses first and second regions 62 and 64 (FIG. 2). Likewise, the presence of first side lobes 116 and 118 adjacent to main lobe 114 of receive antenna pattern 106 are exploited for the purpose of receiving direct and indirect receive signals 78 and 80 (FIG. 4) throughout target zone 46, which encompasses first and second regions 62 and 64.

With reference back to FIG. 2, transmit antenna pattern 104 produced by transmit antenna 72 is illustrated. Although receive antenna pattern 106 (FIG. 6) is not illustrated, the following discussion applies equivalently to receive antenna pattern 106. In an embodiment, each of antenna patterns 104 and 106 is wider in azimuth, i.e., a plane that is approximately parallel to the plane of road 50, than in elevation, i.e., a width that is in a direction approximately perpendicular to the plane of road 50. Azimuth is represented by X and Y coordinates in a three dimensional graph 120 shown in FIG. 2, and elevation is represented by the Z coordinate shown in graph 120. The width of each of antenna patterns 104 and 106 is relatively narrow in elevation in order to reject, or otherwise avoid, the inappropriate reception of reflected signals from objects that are too high or too low to actually be located in lane 52 of road 50.

Transmit antenna pattern 104 is represented by dashed lines having arrows that are directed away from automotive radar system 44. Transmit antenna 72 (FIG. 4) transmits radar signal 74 (FIG. 4) in accordance with transmit antenna pattern 104. Receive antenna pattern 106 (FIG. 6) is not shown for clarity of illustration. Indeed, due to the proximity of receive unit 58 (FIG. 3) to transmit unit 56 (FIG. 3) affixed to mirror 60, receive antenna pattern 106 generally overlaps or overlies transmit antenna pattern 104. However, receive antenna 76 receives reflections of radar signal 74 in accordance with receive transmit pattern 106.

Instead of illustrating receive antenna pattern 106, direct and indirect receive signals 78 and 80, respectfully, with arrows that are directed toward automotive radar system 44 are shown. Direct and indirect receive signals 78A and 80A are reflections of radar signal 74 from object 34, labeled "A."

Similarly, direct and indirect receive signals 78B and 80B are reflections of radar signal 74 from object 36, labeled "B." In an example, reference numeral 80A shown in FIG. 2 represents indirect receive signal 80 reflected from object 34 and subsequently reflected from side 54 of vehicle 42 for receipt at receive antenna 76. Similarly, reference numeral 80B shown in FIG. 2 represents indirect receive signal 80 reflected from object 36 and subsequently reflected from side 54 of vehicle 42 for receipt at receive antenna 76.

Direct and indirect receive signals 78 and 80 represent multipath signal components of the reflection of radar signal 74 from an object within target zone 46. Multipath, also referred to as "multiple-path radio propagation," "multipath interference," or "multipath distortion," is radiation that travels between a source and a receiver via more than one propagation path. Under many conditions, multipath results in interference due to multiple arrivals of the same signal due to reflections. The difference in path lengths creates different arrival times thus causing signal cancellation and degradation. Given that multipath interference can cause signal cancellation and degradation, many radar and communications configurations attempt to mitigate or reduce this multipath interference. In contrast to prior art radar and communications configurations, automotive radar system 44 exploits the multipath signal components of direct and indirect signals to detect objects, e.g., objects 34 and 36, throughout target zone 46.

Transmit antenna 72 (FIG. 4) is positioned for directing transmit antenna pattern 104 outward from side 54 of vehicle 42 and into target zone 46. However, some of the radiated power of antenna pattern 82, i.e., first side lobe 112 of antenna pattern 104, is incident on a reflective body panel of vehicle 42. This radiated power, i.e., radar signal 74 in first side lobe 112, reflects off of the reflective body panel of side 54 into first region 62, i.e., the blind spot, for vehicle 42. This condition is illustrated in FIG. 2, by both of side lobes 110 and 112 being located on the same side of main lobe 108. Side lobe 112 is a reflection of radar signal 74 from side 54 of vehicle 42, and is therefore slightly altered relative to side lobe 110. Thus, transmit antenna 72 is positioned to optimize the reflecting portion of transmit antenna pattern 104, i.e., side lobe 112, from the reflective body panel of vehicle 42 so that radar signal 74 (FIG. 3) is transmitted toward the blind spot, first region 62, of vehicle 42.

Receive antenna 76 (FIG. 4) is positioned to optimize the direction of receive antenna pattern 106 (FIG. 6) outward from reflective body panel of side 54 of vehicle 42 so that direct and indirect receive signals 78 and 80, respectively, reflected off of, for example object 34 located in first region 62 can be received at receive antenna 76. That is, some of the received power, and particularly indirect receive signal 80, is received from a direction associated with the reflective body panel of side 54 of vehicle 42. By way of example, indirect receive signal 80A is reflected off object 34 toward the reflective panel, i.e. side 54, of vehicle 42, and indirect receive signal 80A is subsequently reflected off side 54 of vehicle 42 for receipt at receive antenna 76 (FIG. 4).

The reflective body panel of vehicle 42 can be any smooth exterior structural component that has a reflective, i.e., conductive, exterior surface at, for example, millimeter wave frequencies. The radius of curvature of the reflective body panel should be much larger (for example, ten times greater) than the free space wavelength in order to provide optimal reflective performance.

In an embodiment, tuning parameters for optimizing the direction of transmit and receive antenna patterns 104 and 106 can include, for example, the tilt of the antenna pattern relative to the reflective panel on side 54 of vehicle 42, the width of the antenna pattern in azimuth, and the power level in the first side lobes. The tuning parameters should be adjusted to match vehicle 42, and in particular beam width and side lobe level can be controlled by the design of the assembly. The primary factors are the size of dielectric lens 94 (FIG. 5) and the spacing between feed antenna 92 (FIG. 5) and dielectric lens 94. The size of dielectric lens 94 determines the width of antenna patterns 104 and 106, and the spacing between feed antenna 92 and dielectric lens 94 allows adjustment of the side lobe level and side lobe shape.

In an embodiment, automotive radar system 44 may be common to multiple vehicles. Thus, size of dielectric lens 94 and spacing between feed antenna 92 and lens 94 should be determined to accommodate a variety of vehicles. Performance of automotive radar system 44 can be further tuned on a per vehicle basis by controlling the tilt of transmit and receive units 56 and 58. For example, the angle between the axis of transmit and receive units 56 and 58 should be optimized for the desired reflection location on each vehicle 42 in order to get the highest signal to noise ratio.

In order to detect object 34, the multipath components of the reflected radar signal 74 (FIG. 4), namely the sum of direct receive signal 78A and indirect receive signal 80A, are received at receive unit 58 (FIG. 4) to produce detection signal 81 (FIG. 4) for subsequent notification to an operator of vehicle 42 of the probable presence of object 34, such as another vehicle, in target zone 46. Likewise, in order to detect object 36, the multipath components of the reflected radar signal 74 (FIG. 4), namely the sum of direct receive signal 78B and indirect receive signal 80B, are received at receive unit 58 (FIG. 4) to produce detection signal 81 (FIG. 4) for subsequent notification to an operator of vehicle 42 of the probable presence of object 36, such as another vehicle, in target zone 46. In each case, one of the two signals 78 and 80 will be dominant.

Figure 7:
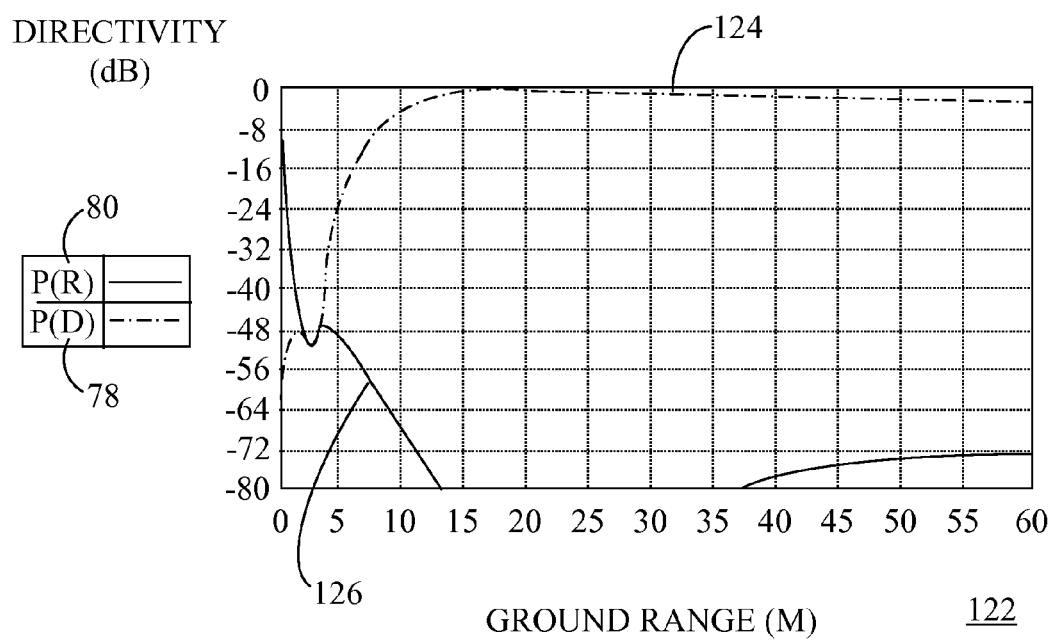
FIG. 7 shows a graph of the directivity of a single beam radar antenna for directly and indirectly propagated received reflections of a radar signal from an object in a target zone of the automotive radar system.

FIG. 7 shows a graph 122 of the directivity of a single beam radar antenna for directly and indirectly propagated receive signals 78 and 80 as reflections of radar signal 74 (FIG. 4) from an object in a target zone 46 of the automotive radar system 44. Directivity is plotted relative to distance behind the mounted location of radar system 44, i.e., the ground range. The term "directivity" refers to a measure of the concentration of radiation in a given direction by an antenna. The directivity, presented as a signal strength 124, of direct receive signal 78 is represented by a dash-dot curve, and the directivity, presented as a signal strength 126, of indirect receive signal 80 is represented by a solid curve.

For objects close to receive antenna 76 (FIG. 4), e.g., within a three meter range, signal strength 126 of indirect receive signal 80 dominates signal strength 124 thus providing detection of object 34 positioned in first region 62, i.e., the blind spot, of target zone 46. However for objects farther away from receive antenna 76, e.g., at ranges that are greater than three meters, signal strength 124 of direct receive signal 78 dominates signal strength 126, thus providing detection of object 36 positioned in second region 64 of target zone 46. In some instances, there may be a small overlap region between first and second regions 62 and 64 where the signal to noise ratio is sufficiently high due to the short range so that a target in this overlap region can still be detected. Accordingly, a combination of direct and indirect receive signals 78 and 80, provides sufficient sensitivity and angular coverage to enable implementation of the relatively simple single beam antenna configuration of automotive radar system 44 for detecting the probable presence of objects throughout target zone 46.

Through the implementation of automotive radar system 44, a method of detecting an object, e.g., objects 34 and 36, in target zone 46 external to vehicle 42 generally entails transmitting radar signal 74 (FIG. 4) from single beam transmit antenna 72 (FIG. 4) of transmit unit 56 (FIG. 4). When an object, e.g., object 34 and/or 36, is present in target zone 46, further methodology entails receiving direct receive signal 78 and indirect receive signal 80 at single beam receive antenna 76 (FIG. 4) of receive unit 58 (FIG. 4), where signals 78 and 80 are reflections of radar signal 74 from the object. Direct receive signal 78 and indirect receive signal 80 are summed to produce detection signal 81 (FIG. 4) indicative of a probable presence of the object, e.g., object 34 and/or object 36, in target zone 46. In other words, the multipath signal components of the reflected radar signal 74 are combined to yield detection signal 81, in lieu of the conventional techniques of minimizing the affects of multipath signal components. In response to detection signal 81, an operator of vehicle 42 may be appropriately alerted to this probable presence of the object, e.g., object 34 and/or object 36, in target zone 46 in order to provide awareness of objects in the vehicle's blind spot and/or to provide awareness of objects which may be approaching vehicle 42 as the operator prepares to change lanes.

Embodiments comprise an automotive radar system and methodology that apply a combination of multipath signal propagation components, e.g., direct and indirect radar signals, to detect objects in a side object detection system. In particular, each of transmit and receive units include a single beam antenna. A radar signal transmitted via the single beam antenna may be detected as reflections from an object in a target zone of the automotive radar system. These reflections can include a direct receive signal reflected from the object and received at the receive unit, and an indirect receive signal that is reflected from the object onto a reflective panel of the vehicle and subsequently received at the receive unit. A combination of direct and indirect radar signals in the automotive radar system for side object detection allows the use of a simple single beam antenna to provide sufficient sensitivity and angular coverage to detect objects in the blind spot as well as objects behind and perhaps approaching the vehicle. Accordingly, embodiments take advantage of the properties of radar and multipath to enhance the performance of a simple, cost effective radar design for blind spot mitigation and lane changing purposes.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A radar system for a vehicle comprising:
   a transmit unit including a single beam transmit antenna for output of a radar signal into a target zone external to said vehicle; and
   a receive unit including a single beam receive antenna capable of receiving a direct receive signal and an indirect receive signal, each of said direct and indirect receive signals being reflections of said radar signal from an object in said target zone, and said direct and indirect receive signals being summed to produce a detection signal indicating a presence of said object in said target zone, wherein said target zone includes a first region adjacent to a side of said vehicle and a second region displaced outwardly and backwardly from a rear quarter panel of said vehicle, and said each of said single beam transmit and receive antennas exhibits an antenna pattern having a main lobe directed in said second region and a side lobe reflected from a reflective panel of said vehicle into said first region such that when said object is located in said second region, a first signal strength of said direct receive signal dominates a second signal strength of said indirect receive signal in said detection signal and when said object is located in said first region, said second signal strength of said indirect receive signal dominates said first signal strength of said direct receive signal in said detection signal.

2. A radar system as claimed in claim 1 wherein each of said single beam transmit and receive antennas produces an antenna pattern having a main lobe and first side lobes joined to each side of said main lobe, said first side lobes being shoulder-type side lobes.

3. A radar system as claimed in claim 1 wherein each of said single beam transmit and receive antennas includes a feed antenna having a patch antenna element.

4. A radar system as claimed in claim 3 wherein said feed antenna is mounted proximate a back surface of a dielectric lens.

5. A radar system as claimed in claim 1 wherein each of said single beam transmit and receive antennas is stabilized to produce a free space equivalent antenna pattern.

6. A radar system as claimed in claim 1 wherein each of said single beam transmit and receive antennas exhibits an antenna pattern that is wider in azimuth than in elevation.

7. A radar system as claimed in claim 1 wherein said radar signal is an indirect transmit signal reflected off said reflective panel of said vehicle toward said object in said target zone, and said indirect receive signal is reflected off said reflective panel for receipt at said receive antenna.

8. A radar system as claimed in claim 1 further comprising:
   a first housing in which said transmit unit is located; and
   a second housing separate from said first housing in which said receive unit is located so that said single beam transmit antenna is separate and isolated from said single beam receive antenna.

9. A radar system as claimed in claim 1 wherein said transmit unit and said receive unit are configured to be mounted to an outside mirror of said vehicle with respective transmit and receive antennas aimed toward said target zone.

10. A radar system as claimed in claim 1 wherein said receive unit provides said detection signal for alerting an operator of said vehicle of said presence of said object in said target zone.

11. A method for detecting an object in a target zone external to a vehicle comprising:
   defining said target zone to include a first region adjacent to a side of said vehicle and a second region displaced outwardly and backwardly from a rear quarter panel of said vehicle;
   transmitting a radar signal from a single beam transmit antenna of a transmit unit into said target zone;
   receiving a direct receive signal and an indirect receive signal at a single beam receive antenna of a receive unit, each of said direct and indirect receive signals being reflections of said radar signal from said object;
   directing a main lobe of an antenna pattern for each of said single beam transmit and receive antennas into said second region such that a side lobe of said antenna pattern is reflected from a reflective panel of said vehicle into said first region, wherein when said object is located in said second region, a first signal strength of said direct receive signal dominates a second signal strength of said indirect receive signal in said detection signal and when said object is located in said first region, said second signal strength of said indirect receive signal dominates said first signal strength of said direct receive signal in said detection signal; and summing said direct and indirect receive signals to produce a detection signal indicative of a presence of said object in said target zone.

12. A method as claimed in claim 11 further comprising selecting each of said single beam transmit and receive antennas that produce an antenna pattern having a main lobe and first side lobes joined to each side of said main lobe.

13. A method as claimed in claim 11 further comprising selecting each of said single beam transmit and receive antennas that produce an antenna pattern that is wider in azimuth than in elevation.

14. A method as claimed in claim 11 wherein said indirect receive signal is reflected off said object in said target zone toward said reflective panel of said vehicle, and said indirect receive signal is subsequently reflected off said reflective panel for receipt at said receive antenna.

15. A method as claimed in claim 11 further comprising alerting an operator of said vehicle of said presence of said object in said target zone in response to said detection signal.

16. A radar system for a vehicle comprising:

a transmit unit including a single beam transmit antenna for output of a radar signal into a target zone external to said vehicle; and a receive unit including a single beam receive antenna capable of receiving a direct receive signal and an indirect receive signal, each of said direct and indirect receive signals being reflections of said radar signal from an object in said target zone, each of said single beam transmit and receive antennas producing an antenna pattern having a main lobe and first side lobes joined to each side of said main lobe, said first side lobes being shoulder-type side lobes, and said antenna pattern being wider in azimuth than in elevation, and said direct and indirect receive signals being summed to produce a detection signal indicating a presence of said object in said target zone, wherein said target zone includes a first region adjacent to a side of said vehicle and a second region displaced outwardly and backwardly from a rear quarter panel of said vehicle, and said each of said single beam transmit and receive antennas exhibits an antenna pattern having said main lobe directed in said second region and one of said first side lobes reflected from a reflective panel of said vehicle into said first region such that when said object is located in said second region, a first signal strength of said direct receive signal dominates a second signal strength of said indirect receive signal in said detection signal and when said object is located in said first region, said second signal strength of said indirect receive signal dominates said first signal strength of said direct receive signal in said detection signal.

17. A radar system as claimed in claim 16 wherein each of said single beam transmit and receive antennas comprises a feed antenna having a single patch antenna element mounted proximate a back surface of a dielectric lens, said feed antenna being stabilized to produce a free space equivalent antenna pattern.

* * * * *